United States Patent
Sun et al.

(10) Patent No.: US 10,363,535 B1
(45) Date of Patent: Jul. 30, 2019

(54) GAS-LIQUID-SOLID THREE-PHASE SLURRY BED INDUSTRIAL REACTOR CAPABLE OF ACHIEVING CONTINUOUS OPERATION

(71) Applicant: SHANGHAI YANKUANG ENERGY R&D CO., LTD., Shanghai (CN)

(72) Inventors: Qiwen Sun, Shanghai (CN); Jianmin Wu, Shanghai (CN); Liang Dong, Shanghai (CN); Zongsen Zhang, Shanghai (CN); Jisen Liu, Shanghai (CN); Jianping Yue, Shanghai (CN); Fang Yan, Shanghai (CN)

(73) Assignee: SHANGHAI YANKUANG ENERGY R&D CO., LTD., Shanghai (CN)

( * ) Notice: Subject to any disclaimer, the term of this patent is extended or adjusted under 35 U.S.C. 154(b) by 0 days.

(21) Appl. No.: 15/956,030

(22) Filed: Apr. 18, 2018

(51) Int. Cl.
*B01J 8/08* (2006.01)
*C10G 2/00* (2006.01)
(Continued)

(52) U.S. Cl.
CPC ............. *B01J 8/22* (2013.01); *B01J 8/005* (2013.01); *B01J 8/085* (2013.01); *B01J 8/087* (2013.01);
(Continued)

(58) Field of Classification Search
CPC ....... B01J 8/22; B01J 8/226; B01J 8/34; B01J 8/44; B01J 8/005; B01J 8/006;
(Continued)

(56) References Cited

U.S. PATENT DOCUMENTS 8,506,895 B2 * 8/2013 Wang .................. B01J 8/006
422/211

FOREIGN PATENT DOCUMENTS

| CN | 2147039 Y | 11/1993 |
| CN | 2199197 Y | 5/1995 |

(Continued)

*Primary Examiner* — Lessanework Seifu
(74) *Attorney, Agent, or Firm* — Hamre, Schumann, Mueller & Larson, P.C.

(57) ABSTRACT

A gas-liquid-solid three-phase slurry bed industrial reactor capable of achieving continuous operation comprises an inlet gas distribution component composed of a false bottom and inlet gas distribution tubes, one or more layers of heat exchange tube components used for heating/cooling the bed, one or more layers of liquid-solid separator components capable of being cleaned automatically, an outlet gas-liquid-solid entrainment separation component located in the upper portion of the interior of the reactor and used for removing liquid foam and solid entrainments, a plurality of layers of solid concentration uniform distribution devices used for reducing the catalyst concentration gradient and the inlet-outlet temperature difference of the reactor, a flow guiding device located on a component support beam and used for preventing catalyst accumulation, and auxiliary systems including a filter-backflush system and a washing system. Compared with the prior art, the reactor is low in energy consumption and solves the problems of blockage, backflow and dead zones, the temperature and liquid level are well controlled, catalysts can be easily added and discharged online, and stable and continuous operation of the reactor is achieved. The reactor is suitable for being applied to the Fischer-Tropsch synthesis process on an industrial scale.

14 Claims, 2 Drawing Sheets

(51) Int. Cl.
*B01J 8/22* (2006.01)
*B01J 8/00* (2006.01)

(52) U.S. Cl.
CPC ..... *C10G 2/343* (2013.01); *B01J 2208/00132* (2013.01); *B01J 2208/00761* (2013.01); *B01J 2208/00902* (2013.01); *B01J 2208/00938* (2013.01); *B01J 2219/00033* (2013.01)

(58) Field of Classification Search
CPC ................... B01J 8/1836; B01J 8/1872; B01J 2208/00761; B01J 2208/00768; B01J 2208/00938; B01J 2208/00902; B01J 2219/00033; C10G 2/344
See application file for complete search history.

(56) References Cited

FOREIGN PATENT DOCUMENTS

| | | | |
|---|---|---|---|
| CN | 2205242 | Y | 8/1995 |
| CN | 2309884 | Y | 3/1999 |
| CN | 1220910 | A | 6/1999 |
| CN | 1258561 | A | 7/2000 |
| CN | 1328485 | A | 12/2001 |
| CN | 1390632 | A | 1/2003 |

* cited by examiner

GAS-LIQUID-SOLID THREE-PHASE SLURRY BED INDUSTRIAL REACTOR CAPABLE OF ACHIEVING CONTINUOUS OPERATION

BACKGROUND OF THE INVENTION

Technical Field

The invention belongs to the field of chemical equipment, and relates to a three-phase slurry bed industrial reactor capable of achieving continuous operation, in particular to structure and size design, gas distribution components, heat exchange components, liquid-solid separation components, liquid-solid uniform distribution components, gas-liquid-solid washing and separation components and the like of reactors, and the application of the reactor to the industrial Fischer-Tropsch synthesis production process.

Description of Related Art

Three-phase (gas-liquid-solid) slurry bed reactors have been widely applied to chemical processes and are reported in existing documents and patents. For example, the Chinese patent CN99127184.X provides a gas-liquid-solid three-phase circulating reactor, the Chinese patent CN99813677.8 and the Chinese Patent CN97227653.X provide jet-type three-phase reactors, the Chinese patent No. 02117348.6 discloses a spouted bed reactor involving no catalytic process, the Chinese patent CN93236114.5 and the Chinese patent No. 94241250.8 relate to settling-type reactors, and the Chinese patent No. 94222395.0 and the Chinese patent CN97227653.X relate to mechanically-stirred tank reactors.

The Chinese patent CN98124535.8 provides an airflow bubbling and suspension-type three-phase reactor. The airflow bubbling and suspension-type three-phase reactor is composed of a bottom tower head provided with an inlet nozzle, one or more heat exchange sections immersed in a synthesis section, a row of outlet nozzles for discharging suspension liquid, an outlet nozzle for exhausting unreacted gas, and a set of transversely inclined membranes for removing dust and foam.

The reactors provided by the above patents have the following problems when applied to industrial reaction processes. The circulating, jet-type and spouted bed reactors are high in energy consumption, and catalysts are prone to abrasion (spouted beds are not suitable for the catalytic reaction process); the settling-type reactors are suitable for an intermittent process and mainly used for wastewater treatment and are not suitable for continuous production; and the mechanical stirred tank reactors are generally used as laboratory reactors due to large energy consumption and severe catalyst abrasion.

The airflow bubbling and suspension-type reactor provided by the Chinese patent No. 98124535.8 has the defects that the gas inlet nozzle is arranged at the bottom of the reactor, gas flows through a gas distributor from bottom to top, and consequentially, blockage or backflow is likely to be caused when gas interruption failures occur; and solid suspension liquid is treated after being discharged so that return of the catalyst can result in large energy consumption and mechanical abrasion. All these defects have negative influences on continuous industrial production.

The reactor has the following characteristics. (1) The inlet gas distribution component and the false plate of the three-phase slurry bed reactor are used in cooperation so that gas-liquid-solid mixing at the bottom of the reaction zone can be effectively improved, and catalyst dead zones at the bottom are avoided; and through a pressurization pipeline and a balance pipeline, the pressure difference of the two sides of the false plate slightly flocculates even under extreme conditions, and thus the safety of the false plate and seal components of the false components is ensured.

(2) The heat exchange component is simple in structure and large in tube density, thereby being capable of ensuring a sufficient heat exchange area and adaptable to various complex working conditions and drastic load changes.

(3) Through the reasonable dimension and layout of the liquid-solid separation component, gas-liquid-solid three-phase mixing can be remarkably improved; and the liquid-solid separator component and the heat exchange tube component are used in cooperation so that the heat exchange effect can be enhanced.

(4) The liquid-solid separation component and the filter-backflush system are adopted so that operation is simple and efficient, the catalyst content of extracted liquid products can be effectively deceased, and thus the requirements for backflush and product quality are met.

(5) The gas-liquid-solid washing and separation component and the washing system are adopted so that the catalyst in gas products can be effectively removed, the catalyst loss is reduced, and the risk of blockage of downstream equipment is reduced.

The three-phase slurry bed reactor is strictly optimized in Fischer-Tropsch synthesis technique and process and systematically verified in devices on the pilot scale and the million-ton industrial scale, and the perfectly-optimized reactor and the auxiliary systems of the reactor are formed based on hydromechanics studies on slurry beds. Through the optimal configuration of the reactor and the auxiliary systems, it is ensured that the reactor can stably and continuously operate in a Fischer-Tropsch synthesis device for a long time.

BRIEF SUMMARY OF THE INVENTION

To overcome the defects of the prior art mentioned above, the reactor provides a gas-liquid-solid three-phase slurry bed industrial reactor capable of achieving continuous operation. Through effective structural arrangement, the reactor can achieve stable and continuous industrial operation.

The following technical scheme is adopted by the reactor. The gas-liquid-solid three-phase slurry bed industrial reactor capable of achieving continuous operation is characterized by at least comprising the following four component parts: a false plate arranged on a reactor seal head, an inlet gas distribution component, heat exchange tube components, a liquid-solid separator component and solid concentration uniform distribution components arranged at the bottom of the reactor, a gas-liquid-solid washing and separation component arranged on an upper outlet of the reactor, and a flow guiding facility arranged on an internal component support beam of the reactor, and further comprising systems matched with the above components. The systems include a filter-flush and a washing system.

The inlet gas distribution component (2) is composed of a set of gas distribution tubes arranged at the bottom of the reactor. The gas distribution tubes are provided with holes and nozzles, the nozzles are evenly distributed on the section of the reactor and are open downwards or laterally, and the inner diameter of the nozzles should make sure that the pressure drop generated when gas passes through the nozzles of the distribution tubes is 0.01 MPa-0.1 MP. The aperture of the gas nozzles of the gas distribution component is 1.5-20 mm. The nozzles, which are used for gas distribution and are open laterally, of the gas distribution component are spaced from the inner surface of a bottom seal head where the reactor body is located by 30-200 mm. The nozzles, which are used for gas distribution and are open downwards, of the gas distribution component are spaced from the inner surface of the false bottom of the reactor by 30-300 mm. Via the nozzles of the gas distribution component, gas can scour the inner surface of the bottom seal head and the inner surface of the false bottom of the reactor at the gas velocity of 20-100 m/s. A gas inlet main pipe of the gas distribution component can be located at the bottommost end of the bottom seal head of the reactor to allow gas to enter the reactor from the bottom, can also be located at a position slightly above the bottom seal head of the reactor to allow gas to transversely enter the reactor from the lateral side, and can also divide gas into 1-4 streams entering the reactor separately. To prevent the situation that slurry flows back into the gas distribution component and the situation that the catalyst deposits at the bottom in the shutdown state, an emergency nitrogen pipeline connected with a feed pipeline or a gas distributor is arranged and instantly guides nitrogen into the reactor when feed synthesis gas is interrupted, and thus the superficial gas velocity in the reactor is kept no lower than the settling velocity of the largest catalyst particles and is generally not lower than 0.1 m/s.

The false plate (3) is a round partition plate and forms a false bottom zone isolated from a reaction zone together with the bottom seal head, and a balance tube is arranged between the false bottom zone and the outlet of the reactor. The upper surface of the false plate needs to be smooth, and the maximum distance from the false plate to the gas distribution tube set is no more than three times greater than the total length of each nozzle. The false plate is scoured by gas sprayed out by the gas distribution component, and thus dead zones caused by the irregular shape (generally a cone shape or ellipsoid shape) of the bottom seal head can be effectively avoided. Specifically, the distance from the false plate to the outlet of each nozzle is 30-300 mm, and the scouring speed is 20-100 m/s. To prevent the deformation of a seal structure (such as a weld joint) at the junction of the false plate and a shell besides a support component, a balance pipeline (S10) is also arranged below the false plate to balance the pressures of the two sides of the false plate. The support component can be a cross beam, a support column or the combination of the cross beam and the support column and is fixed to a reactor cylinder or the bottom seal head and used for bearing the vertical downward stress of the false plate. Process gas with a pressure approximate to the pressure of the reaction zone or other gas such as nitrogen with a pressure approximate to the pressure of the reactor can be guided in through the balance pipeline. The outlet of the balance pipeline is disposed on a pipeline or equipment downstream from the gas outlet of the reactor. Under overpressure or other extreme conditions of the reactor, the pressure of the outlet of the balance pipeline is increased accordingly, and therefore, synchronous fluctuation of the pressure of the false bottom zone and the pressure of the reaction zone in the reactor is ensured, and excessive deformation, caused by an overlarge pressure difference of the two sides of the false plate, of the false plate is prevented.

The heat exchange tube components (4) are composed of one or more layers of heat exchange tubes. Two types of heat exchange tubes are adopted: for one type, spiral coil-type heat exchange tubes which are multi-turn coils concentric with the reactor are adopted, and heat exchange media spirally flow in the coils from top to bottom; and for the other type, back-and-forth multi-pass exchange tubes are adopted, a plurality of vertical heat exchange tubes are combined through upper and lower chaining bends, liquid flows up and down back-and-forth in each heat exchange tube, and multiple sets of heat exchange tubes of this type are arranged on the same section.

One or more solid concentration uniform distribution components (5) are arranged in a reactor bed, close to the wall of the reactor and each composed of a funnel-shaped settling tube (5a) and a delivery tube (5b) connected with the bottom of the funnel-shaped settling tube (5a). The top ends of the settling tubes are located above heat transfer devices, the delivery tubes are parallel to heat transfer coils, the bottom ends of the settling tubes are located below the heat transfer devices, and the solid concentration uniform distribution components are used for improving slurry circulation and reducing the axial catalyst concentration gradient and the inlet-outlet temperature difference of the reactor.

The solid concentration uniform distribution components (5) are special internal components used for enhancing gas-liquid-solid three-phase mixing. The operating principle of the solid concentration uniform distribution components (5) is as follows: gas-liquid-solid three-phase flow enters the large-diameter settling tubes moving back-and-forth, big bubbles continue to move upwards under the effect of buoyancy, slurry deposits in the tubes under the gravity effect, and thus low-gas-content and high-density zones are formed in the settling tubes; and the slurry with the big bubbles removed moves downwards under the gravity effect and flows to the zone below the reactor bed through the delivery tubes. The slurry moving downwards in the solid concentration uniform components and the three-phase flow moving upwards in the reaction zone form a fluid circulation loop, and a stirring effect is achieved. Generally, the diameter of the settling tubes of the solid concentration uniform distribution components is 0.2-1.5 m, the diameter of the delivery tubes is 0.1-0.7 m, and the area of the settling tubes on each layer is 10%-30% of the sectional area of the reaction zone. To enhance mixing of the slurry around a cooler and improve the convection heat exchange efficiency of the slurry side, the solid concentration uniform distribution components and the heat exchange tube components are used in cooperation to form stir zones around the heat exchange tube components. Under the shearing force effect of the wall to the three-phase flow, the diameter and speed of the air bubbles at the center of the reaction zone are large, the diameter and speed of the air bubbles close to the wall are small. To make radial distribution of the three-phase flow more uniform, the solid concentration uniform distribution components are evenly distributed at the center of the reactor and positions close to the wall. Specifically, the solid concentration uniform distribution components are arranged at the axis or symmetrically arranged around the axis, and the center distance between every two adjacent solid concentration uniform distribution components is 0.5-2 m.

The liquid-solid separator component (6) is one or more layers of liquid-solid separation devices arranged in the reactor, and liquid products or to-be-displaced liquid is separated from solid particles through the liquid-solid separation device. Each liquid-solid separation device comprises one or more sets of liquid-solid separation elements. Each set of liquid-solid separation elements is composed of one liquid-solid separation element or multiple parallel liquid-solid separation elements, and the parallel liquid-solid separation elements are combined through an upper communication pipe and a lower communication pipe and then connected to a main pipe outside the reactor. To prevent the liquid-solid separation device from being blocked, a special backflush control program is set to regularly back flush and clean the liquid-solid separation elements. Meanwhile, for controlling the liquid level, the number of liquid-solid separation elements put into use through the backflush control program can be adjusted, and the backflush medium is liquid or gas.

The liquid-solid separator component (6) is composed of 5-30 filter assemblies. Each filter assembly is composed of 5-30 filter elements (6c), a filter header pipe (6a) and a flushing header pipe (6b), and the filter header pipe (6a) and the flushing header pipe (6b) are connected with the filter elements (6c). The filter elements can be made of sintered metal or porous ceramic, the maximum particle size of catalysts allowed to pass through the filter elements is 10-40 μm, and the catalyst content of filtered slurry is lower than 100 ppm. Filtered Fischer-Tropsch wax contains a large quantity of gas products and synthesis gas, and thus to prevent gas blockage, filtrate is guided out and then into the filter header pipe above the filter elements, and correspondingly, the lower portions of the filter elements are connected with the flushing header pipe. When two layers of coolers are adopted, the liquid-solid separator component is mounted between the two layers of heat exchange tube components; and when three layers of heat exchange tube components are adopted, the liquid-solid separator component is preferably mounted between the heat exchange tube component on the top layer and the heat exchange tube component on the middle layer, and thus the content of carbon monoxide and hydrogen contained in the gas is reduced. To make sure that the filter assemblies have the same filter capacity and flush quantity, the filter assemblies should comprise the same number of filter elements to the maximum extent.

The outlet gas-liquid-solid washing and separation component (7) is composed of a backflow wax sprayer, a backflow condensate fluid sprayer, a liquid distributor and a gas-liquid-solid entrainment separator, wherein the backflow wax sprayer is arranged below the backflow condensate fluid sprayer, the liquid distributor is arranged below the sprayers, the gas-liquid-solid entrainment separator is arranged above the sprayers and the liquid distributor and connected with the gas outlet at the top of the reactor, and an online flushing device is arranged in the gas-liquid-solid entrainment separator and used for flushing with nitrogen or reaction gas.

A medium with a low catalyst content is adopted by the gas-liquid-solid washing and separation component (7) to wash gas products, entrainments in the gas products are then removed, and thus the catalyst content of the gas products is decreased. The gas-liquid-solid washing and separation component comprises the sprayer used for evenly distributing chilling liquid, the liquid distributor used for enhancing gas-liquid contact, and a gas-liquid separator used for separating liquid drops from the gas products. The gas products leaving the reaction zone make reverse contact with wax with a low catalyst content (<100 ppm) on the liquid distributor below the backflow wax sprayer, and most catalyst-containing entrainments in the gas products are absorbed by the backflow wax and then carried back into the reaction zone. Afterwards, the gas products continue to make reverse contact with backflow condensate liquid containing almost no catalyst (<5 ppm), and the catalyst is further captured. In addition, under the condensation effect of the backflow condensate liquid on the gas products, gas-liquid two-phase mass transfer is generated, and thus the washing effect can be further enhanced. The chilled gas products and the entrainments, containing almost no catalyst, in the gas products enter the gas-liquid separator, the entrainments collide with and adhere to a baffle plate and then flow back to the liquid distributor along the baffle plate, and the gas products penetrate through the baffle plate to flow out of the reactor.

The auxiliary systems include the filter-backflush system and the washing system, and the filter-backflush system and the washing system are separately connected with the liquid-solid separator component and the gas-liquid-solid washing and separation component in the reactor and used in combination.

The filter-backflush system is composed of a wax collection tank (V1), a wax buffer tank (V2), a filter (F1), a backflush wax collection tank (V3), a backflush wax pump (P1), a backflush wax tank (V4), a filter valve (VLV1) and a backflush valve (VLV2). An inlet of the wax collection tank is connected with the filter header pipe of the liquid-solid separation device through a pipeline with the filter valve, and a liquid-phase outlet of the wax collection tank is connected with the wax buffer tank. A liquid-phase outlet of the wax buffer tank is connected with the filter. A filtrate outlet of the filter is connected with the backflush wax collection tank. A liquid-phase outlet of the backflush wax collection tank is connected with the backflush wax pump. An outlet of the backflush wax pump is connected with the backflush wax tank. A liquid-phase outlet of the backflush wax collection tank is connected with the flushing header pipe of the liquid-solid separation device through a pipeline with the backflush valve.

The filter-backflush system is used for filtering the Fischer-Tropsch wax in the reactor and flushing the liquid-solid separation device. The filter-backflush operating process involves a filter state, a flush state and an optional wait state and is completed through control over the filter valve and the flush valve connected with the liquid-solid separation device. Specifically, to switch one or more filter assemblies to the flush state from the filter state, in one scheme, the filter assemblies are switched to the wait state and then switched to the filter state after the wait state, and the process is repeated; and in another scheme, the filter assemblies are directly switched to the flush state after the filter state, and the process is repeated. In the filter state, the filter valve is opened and the flush valve is closed for 10-30 min. In the wait state, the filter valve is closed and the flush valve is also closed for 5-20 min. In the flush state, the filter valve is closed and the flush valve is opened for 2-20 s.

The gas-solid washing system is composed of a product gas cooler (C1), a condensate liquid separation tank (V5), a condensate liquid backflow pump (P3) and a wax backflow pump (P2). An inlet of the product gas cooler is connected with the gas outlet of the reactor, and an outlet of the product gas cooler is connected with the condensate liquid separation tank. An oil-phase outlet of the condensate liquid separation tank is connected with the condensate liquid backflow pump. An outlet of the condensate liquid backflow pump is connected with the condensate liquid sprayer of the gas-liquid-solid washing and separation device. An inlet of the wax backflow pump is connected with the wax collection tank according to claim 8, and an outlet of the wax backflow pump is connected with the backflow wax sprayer according to claim 7. The gas-solid washing system is used for condensing and separating the gas products and delivering oil-phase condensate liquid and wax separated out by the liquid-solid separation device to the washing and separation device. Gas at the outlet of the reactor is cooled to 20-150° C. after entering the cooler, and water and heavy hydrocarbon in the gas are condensed into liquid. According to technological requirements, the cooler can be one or the combination of a precooler using intake synthesis gas or other low-temperature process fluid as a cooling medium, a water cooler using circulating water as a cooling medium, and an air cooler using air as the cooling medium. The cooled gas enters the condensate liquid separation tank for gas-oil-water three-phase separation. Part of the oil-phase condensate liquid is extracted as a product, and the other part of the oil-phase condensate liquid is delivered to the condensate liquid sprayer through the condensate liquid backflow pump. The wax backflow pump delivers wax in the wax collection tank to the backflow wax sprayer. Wherein, the liquid-gas ratio of the condensate liquid to the gas products is 2-4 L/m$^3$, the liquid-gas ratio of the backflow wax to the gas products is 0.4-1 L/m$^3$, and the temperature of the chilled gas products is lower than the temperature of the reaction zone by 10~60° C.

A check valve (10) is arranged at the position, close to the reactor, of the inlet main pipe of the inlet gas distribution component (2). A high-pressure N$_2$ accident scavenging pipeline (11) is arranged behind the check valve, and a check valve (12) is arranged on the high-pressure N$_2$ accident scavenging pipeline.

An outer coil is further arranged at the bottom of the reactor. During an exothermic reaction, cooling water is injected into the outer coil to maintain a certain temperature. During an endothermic reaction, steam is injected into the coil to maintain the operating temperature of the reactor.

Cooling media or heating media flow in the heat exchange tube components (4). For the back-and-forth multi-pass exchange tubes, high-temperature heat-conducting liquid media are used as heating media.

An online adding port (S12) is arranged in the middle of the reactor and used for adding fresh catalyst slurry or liquid used as inert media into the reactor. An online discharging port (S13) is arranged at the bottom of the reactor, used for discharging the catalyst slurry and matched with the online adding port in operation to maintain a certain liquid level and to keep the slurry concentration stable.

The flow guiding facility is arranged on the surface of the internal component support beam of the reactor. The section of the flow guiding facility is an isosceles triangle. The bottom angle of the flow guiding facility is 30-80 degrees. The flow guiding facility is filled with refractory materials. The surface of the flow guiding facility needs to be smooth, so that the catalyst is discharged smoothly, and hot spots formed on the support beam due to catalyst deposition are prevented.

DETAILED DESCRIPTION OF THE INVENTION

The following embodiment provides an illustrative reactor on an industrial demonstration scale and for the process of generating liquid fuel through synthesis gas, namely the Fischer-Tropsch synthesis process. The reactor is provided with all the internal components of the reactor mentioned above. A description of the illustrative reactor is given with FIGS. 1-3 as follows.

According to the Fischer-Tropsch synthesis reactor, synthesis gas mainly containing hydrogen and carbon monoxide is used for Fischer-Tropsch synthesis in a slurry bed under the effect of the catalyst and under operating conditions of 200-250° C. and 2.0-5.0 MPa, and thus a series of hydrocarbon compounds are generated. Condensate and wax are obtained after the hydrocarbon compounds are chilled, flash evaporated, separated and filtered. The wax which serves as the liquid medium in the reactor as well as an important synthetic product is recovered, and the catalyst is left in the reactor.

As the Fischer-Tropsch synthesis process is a strong exothermic process, the temperature of the reactor needs to be well controlled. On the one hand, effective heat exchange measures need to be taken, and on the other hand, gas circulating in the reactor needs to be distributed uniformly.

Figure 1:
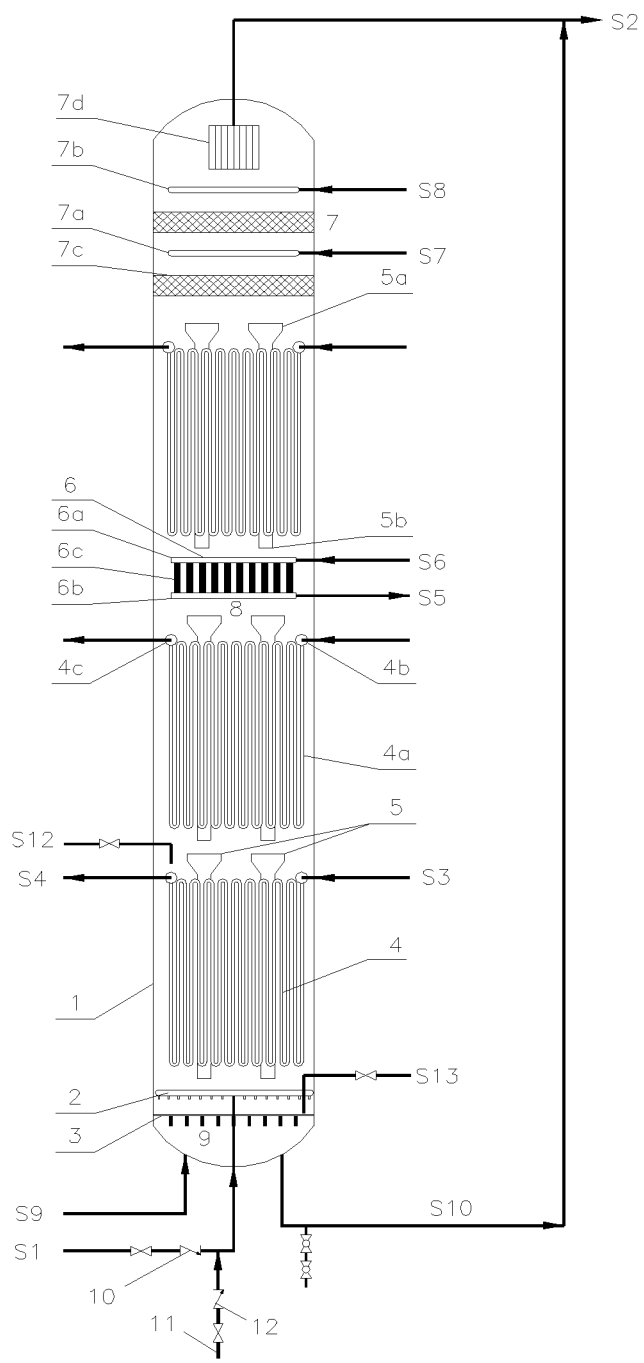
FIG. 1 is a structural diagram of a Fischer-Tropsch synthesis reactor on an industrial demonstration scale and for producing liquid fuel through synthesis gas.
Figure 2:
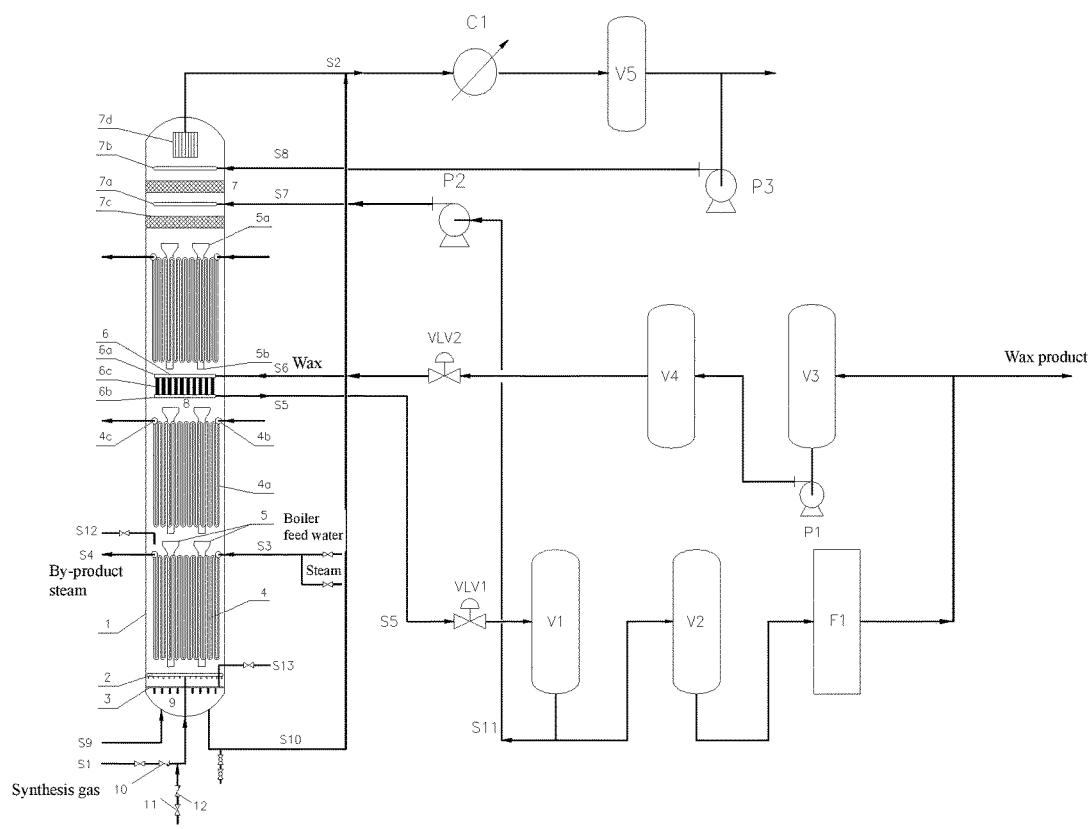
FIG. 2 is a flow diagram of a whole reactor system.

As is shown in FIG. 1 and FIG. 2, the inner diameter of the Fischer-Tropsch synthesis reactor is 9.8 m, and the height of the Fischer-Tropsch synthesis reactor is 54 m. The reactor is internally provided with all the internal components of the invention. Wherein, 1, slurry bed reactor; 2, gas distribution component; 3, false plate; 4, heat exchange tube component; 4a, heat transfer cold pipe; 4b, inlet header pipe; 4c, outlet header pipe; 5, liquid-solid uniform distribution component; 5a, settling tube; 5b, delivery tube; 6, liquid-solid separation component; 6a, filter header pipe; 6b, flushing header pipe; 6c, filter element; 7, gas-liquid-solid washing and separation device; 7a, backflow wax sprayer; 7b, backflow condensate liquid sprayer; 7c, liquid distributor; 7d, gas-liquid separator; 8, reaction zone; 9, false bottom zone; S1, feed gas; S2, gas-phase outlet; S3, boiler feed water; S4, by-product steam; S5, extracted Fischer-Tropsch wax; S6, flush wax; S7, backflow wax; S8, backflow condensate liquid; S9, pressurization tube; S10, balance tube; S11, backflow wax; S12, catalyst slurry online adding port; S13, catalyst slurry online discharging port; V1, wax collection tank; V2, wax buffer tank; V3, backflush wax collection tank; V4, backflush wax tank; V5, condensate liquid separator; VLV1, filter valve; VLV2, flush valve; F1, fine filter; P1, backflush wax pump; P2, wax backflow pump; P3, condensate liquid backflow pump.

Synthesis gas enters the reactor from the gas inlet distribution component and is distributed on the branch-type distribution tubes. The nozzles are open downwards or laterally, and the inner diameter of the nozzles is designed to make sure that the pressure drop generated when gas passes through the nozzles of the distribution tubes is not lower than 0.05 MPa, and thus gas can evenly enter the slurry bed reactor.

A first layer and a second layer of heat exchange tubes (4) are generally located above the gas inlet distribution component. The heat exchange tubes are back-and-forth multi-pass heat exchange tubes. For the exothermic Fischer-Tropsch synthesis reaction, boiler feed water flows in the coils, and the reactor bed is cooled through the boiler feed water. However, when the reactor is started, steam can also be injected into the heat exchange tubes to preheat catalyst slurry.

The liquid-solid separation device (6) is arranged above the second layer of heat exchange tubes and composed of a plurality of filter elements, and each filter element is a tubular filter element. The upper port of each tubular filter element is a backflush liquid inlet (S6), and the lower port of each tubular filter element is a filtered liquid outlet (S5).

The filtered liquid outlets/backflush inlets are provided with valves outside the reactor and controlled through a special filter/backflush program to make sure that the liquid level of the reactor is maintained at a certain value.

A catalyst slurry online adding port (S12) is formed at the lower end of the second layer of heat exchange tubes (4) of the reactor, and fresh catalyst slurry is added into the reactor according to requirements. In the process, slurry needs to be discharged through a catalyst slurry online discharging port (S13) at the bottom to maintain a certain liquid level and to keep the catalyst concentration stable. As the catalyst is reduced in another reduction reactor, the catalyst can be updated online timely to ensure stability of average activity.

During normal operation, the liquid level is slightly above the third layer of heat exchange tubes, the gas-liquid-solid washing and separation component is located above the liquid level, gas containing liquid and a small quantity of solids enters the gas-liquid separator at the top through the space between the liquid level and the gas-liquid-solid washing and separation component, gas containing liquid foam impacts the baffle plate, so that most liquid drops and solids are captured, and gas is exhausted through a gas-phase outlet (S2). The gas-liquid-solid washing and separation component is provided with the washing system, and liquid drops over 8 μm can be completely removed through the gas-liquid-solid washing and separation component, so that blockage is avoided.

The catalyst used in the reactor is the Fischer-Tropsch synthesis Fe-based catalyst disclosed in the embodiment of the patent No. CN1233463C (ZL03151108.2), the average granularity is 50 μm, and the weight concentration of catalyst slurry is 35%. In the two-year operation time of the reactor, the gas distribution condition is good, temperature control is stable, the liquid-solid separation device is not blocked, the average activity is table, and the total conversion rate of $H_2$ and CO is always kept at 80-96% under the synthesis conditions where the temperature is 240° C., the pressure is 3.0 MPa and the inlet linear speed is 0.45 m/s. All the components of the reactor are designed conservatively, and thus all indexes reach or exceed design requirements.

FIG. 2 is a diagram of the reactor system in the embodiment, wherein (10) and (12) refer to check valves for preventing backflow of gas, and (11) refers to a high-nitrogen accident pipeline for handling blockage of the nozzles of the distribution tubes caused when synthesis gas is interrupted or the pressure is instable.

While the embodiment of the invention is described in detail above, various improvements and changes can be easily made by these skilled in the field without deviating from the basic spirit of the invention. All these improvements and changes are within the protection scope of the invention.

What is claimed is:

1. A gas-liquid-solid three-phase slurry-bed industrial reactor capable of achieving continuous operation, comprising:
    a false plate arranged on a seal head of the reactor,
    an inlet gas distribution component,
    heat exchange tube components,
    a liquid-solid separator component,
    solid concentration uniform distribution components,
    a gas-liquid-solid washing and separation component arranged on an upper outlet of the reactor,
    a flow guiding facility arranged on an internal component support beam of the reactor,
    a filter-backflush, and
    a gas-solid washing system.

2. The gas-liquid-solid three-phase slurry-bed industrial reactor capable of achieving continuous operation according to claim 1,
    wherein the inlet gas distribution component includes a set of gas distribution tubes arranged at a bottom of the reactor, the gas distribution tubes are provided with holes and nozzles, the nozzles are evenly distributed on a section of the reactor and are open downwards or laterally, and an inner diameter of the nozzles is configured to obtain a pressure drop of 0.01 MPa-0.1 MPa generated when gas passes through the nozzles of the gas distribution tubes;
    an aperture of the nozzles of the inlet gas distribution component is 1.5-20 mm;
    the nozzles of the inlet gas distribution component are spaced from an inner surface of a bottom seal head where a body of the reactor is located by 30-200 mm; the nozzles of the inlet gas distribution component are spaced from an inner surface of a false bottom of the reactor by 30-300 mm;
    via the nozzles of the inlet gas distribution component, gas can scour the inner surface of the bottom seal head and an inner surface of the false plate of the reactor at a gas velocity of 20-100 m/s; and
    a gas inlet main pipe of the inlet gas distribution component is located at a bottommost end of the bottom seal head of the reactor to allow gas to enter the reactor from the bottom, or at a position slightly above the bottom seal head of the reactor to allow gas to transversely enter the reactor from the lateral side, and
    the gas inlet main pipe optionally divides the gas into 1-4 streams entering the reactor separately.

3. The gas-liquid-solid three-phase slurry-bed industrial reactor capable of achieving continuous operation according to claim 1,
    wherein the false plate is a round partition plate and forms a false bottom zone isolated from a reaction zone together with a bottom seal head, and a balance tube is provided between the false bottom zone and the outlet of the reactor;
    an upper surface of the false plate is smooth, and a maximum distance between the false plate and a set of gas distribution tubes of the inlet gas distribution component is no more than three times greater than a total length of a nozzle of the inlet gas distribution component; the false plate is scoured by gas sprayed out by the inlet gas distribution component, and thus dead zones caused by an irregular shape of the bottom seal head can be effectively avoided; and specifically, a distance from the false plate to the outlet of the nozzle is 30-300 mm, and a scouring velocity is 20-100 m/s.

4. The gas-liquid-solid three-phase slurry-bed industrial reactor capable of achieving continuous operation according to claim 1, wherein the heat exchange tube components include one or more layers of heat exchange tubes; the heat exchanger tubes include a first and a second type of heat exchange tubes,
    the first type of heat exchange tubes includes spiral coil-type heat exchange tubes which are multi-turn coils concentric with the reactor, and heat exchange media spirally flow in the multi-turn coils from top to bottom,
    the second type of heat exchange tubes includes a plurality of vertical multi-pass heat exchange tubes that are combined through upper and lower chaining bends, liquid in the vertical multi-pass heat exchange tubes flows up and down back-and-forth, and multiple sets of the vertical multi-pass heat exchange tubes are arranged on a same section.

5. The gas-liquid-solid three-phase slurry-bed industrial reactor capable of achieving continuous operation according to claim 1,
wherein the liquid-solid separator component includes one or more layers of liquid-solid separation devices in the reactor, and liquid products or liquid is separated from solid particles through the liquid-solid separation devices;
each of the liquid-solid separation devices comprises one or more sets of liquid-solid separation elements;
each set of liquid-solid separation elements is composed of one liquid-solid separation element or multiple parallel liquid-solid separation elements, and the multiple parallel liquid-solid separation elements are combined through an upper communication pipe and a lower communication pipe and then connected to a main pipe outside the reactor;
to prevent the liquid-solid separation devices from being blocked, a backflush control program is set to regularly back flush and clean the liquid-solid separation elements; and
for controlling the liquid level, the number of liquid-solid separation elements put into use through the backflush control program is adjustable, and a backflush medium is liquid or gas.

6. The gas-liquid-solid three-phase slurry-bed industrial reactor capable of achieving continuous operation according to claim 1, wherein the solid concentration uniform distribution components are provided in a reactor bed, each of the solid concentration uniform distribution components includes a funnel-shaped settling tube and a delivery tube connected with a bottom of the funnel-shaped settling tube; and a top end of the funnel-shaped settling tube is located above the heat exchange tube components, the delivery tube is parallel to heat transfer coils of the heat exchange tube components, a bottom end of the funnel-shaped settling tube is located below the heat exchange tube components, and the solid concentration uniform distribution components are for improving slurry circulation and reducing axial catalyst concentration gradient and an inlet-outlet temperature difference of the reactor.

7. The gas-liquid-solid three-phase slurry-bed industrial reactor capable of achieving continuous operation according to claim 1, wherein the gas-liquid-solid washing and separation component includes a backflow wax sprayer, a backflow condensate fluid sprayer, a liquid distributor, and a gas-liquid-solid entrainment separator,
the backflow wax sprayer is arranged below the backflow condensate fluid sprayer,
the liquid distributor is arranged below the backflow condensate fluid sprayer,
the gas-liquid-solid entrainment separator is arranged above the backflow condensate fluid sprayers and the liquid distributor and is connected with a gas outlet at a top of the reactor, and
an online flushing device is provided in the gas-liquid-solid entrainment separator for flushing with nitrogen or reaction gas.

8. The gas-liquid-solid three-phase slurry-bed industrial reactor capable of achieving continuous operation according to claim 1, wherein the filter-backflush system includes a wax collection tank, a wax buffer tank, a filter, a backflush wax collection tank, a backflush wax pump, a backflush wax tank, a filter valve, and a backflush valve,
wherein an inlet of the wax collection tank is connected with a filter header pipe of the liquid-solid separator component through the filter valve, a liquid-phase outlet of the wax collection tank is connected with the wax buffer tank, a liquid-phase outlet of the wax buffer tank is connected with the filter; a filtrate outlet of the filter is connected with the backflush wax collection tank, a liquid-phase outlet of the backflush wax collection tank is connected with the backflush wax pump, an outlet of the backflush wax pump is connected with the backflush wax tank, and a liquid-phase outlet of the backflush wax collection tank is connected with a flushing header pipe of the liquid-solid separator component through the backflush valve.

9. The gas-liquid-solid three-phase slurry-bed industrial reactor capable of achieving continuous operation according to claim 1, wherein the gas-solid washing system includes a product gas cooler, a condensate liquid separation tank, a condensate liquid backflow pump, and a wax backflow pump,
wherein an inlet of the product gas cooler is connected with a gas outlet of the reactor, an outlet of the product gas cooler is connected with the condensate liquid separation tank, an oil-phase outlet of the condensate liquid separation tank is connected with the condensate liquid backflow pump, an outlet of the condensate liquid backflow pump is connected with a condensate liquid sprayer of the gas-liquid-solid washing and separation component, an inlet of the wax backflow pump is connected with a wax collection tank of the filter-backflush system, and an outlet of the wax backflow pump is connected with a backflow wax sprayer of the gas-liquid-solid washing and separation component.

10. The gas-liquid-solid three-phase slurry-bed industrial reactor capable of achieving continuous operation according to claim 2, wherein a check valve is provided at the gas inlet main pipe of the inlet gas distribution component; and a high-pressure $N_2$ accident scavenging pipeline is provided behind the check valve, and another check valve is provided at the high-pressure $N_2$ accident scavenging pipeline.

11. The gas-liquid-solid three-phase slurry-bed industrial reactor capable of achieving continuous operation according to claim 1, wherein an outer coil is further provided at a bottom of the reactor; during an exothermic reaction, cooling water is injected into the outer coil to maintain a desired temperature; and during an endothermic reaction, steam is injected into the outer coil to maintain an operating temperature of the reactor.

12. The gas-liquid-solid three-phase slurry-bed industrial reactor capable of achieving continuous operation according to claim 4, wherein cooling media or heating media flow through the heat exchange tube components; and for the second type of heat exchange tubes, the heating media is a high-temperature heat-conducting liquid media.

13. The gas-liquid-solid three-phase slurry-bed industrial reactor capable of achieving continuous operation according to claim 1, wherein an online adding port is provided in a middle of the reactor, the online adding port adds fresh catalyst slurry or liquid as an inert media into the reactor, and an online discharging port is provided at a bottom of the reactor, the online discharging port discharges the catalyst slurry and is matched with the online adding port in operation to maintain a desired liquid level and to maintain a stable slurry concentration.

14. The gas-liquid-solid three-phase slurry-bed industrial reactor capable of achieving continuous operation according to claim 1, wherein the flow guiding facility is arranged on a surface of the internal component support beam of the reactor, a section of the flow guiding facility is an isosceles triangle, a bottom angle of the flow guiding facility is 30-80 degrees, the flow guiding facility is filled with a refractory material, and a surface of the flow guiding facility is smooth, so that the catalyst is discharged smoothly and hot spots formed on the internal component support beam due to catalyst deposition are prevented.

* * * * *